US011750458B1

(12) United States Patent
DiLeo et al.

(10) Patent No.: US 11,750,458 B1
(45) Date of Patent: Sep. 5, 2023

(54) STRUCTURED NETWORK CHANGE CONTROLS

(71) Applicant: Arista Networks, Inc., Santa Clara, CA (US)

(72) Inventors: Philip DiLeo, Greenwich, CT (US); Ryan Madsen, San Francisco, CA (US); Goran Jawdat, Dublin (IE); Philip Drury, Drury (IE)

(73) Assignee: ARISTA NETWORKS, INC., Santa Clara, CA (US)

( * ) Notice: Subject to any disclaimer, the term of this patent is extended or adjusted under 35 U.S.C. 154(b) by 27 days.

(21) Appl. No.: 17/701,449

(22) Filed: Mar. 22, 2022

(51) Int. Cl.
*H04L 41/082* (2022.01)
*G06F 8/65* (2018.01)

(52) U.S. Cl.
CPC .............. *H04L 41/082* (2013.01); *G06F 8/65* (2013.01)

(58) Field of Classification Search
CPC . H04L 41/082; H04L 41/084; H04L 41/0843; H04L 41/085; H04L 41/0856; H04L 41/0866; H04L 41/0806; H04L 41/0809; H04L 41/0681; H04L 41/0803; H04L 41/065; H04L 41/0654; H04L 41/0659; H04L 41/0661; H04L 41/08; H04L 41/12; H04L 41/22; H04L 12/2807; H04L 12/437; H04L 12/40176; H04L 12/4675; G06F 8/65; G06F 11/2053
USPC .................................................. 709/220, 221
See application file for complete search history.

(56) References Cited

U.S. PATENT DOCUMENTS

| | | | | |
|---|---|---|---|---|
| 7,249,170 | B2 * | 7/2007 | Tindal | H04L 43/00 709/224 |
| 7,702,517 | B2 * | 4/2010 | Parapadakis | G06Q 10/06 705/7.28 |
| 8,838,755 | B2 * | 9/2014 | Sanghvi | H04L 41/046 709/221 |
| 9,077,611 | B2 * | 7/2015 | Cordray | H04L 67/34 |
| 9,648,106 | B2 * | 5/2017 | Karandikar | G06F 3/067 |
| 10,642,633 | B1 * | 5/2020 | Chopra | G06F 9/45533 |
| 10,764,133 | B2 * | 9/2020 | Ganesan | H04L 41/0816 |
| 10,922,075 | B2 * | 2/2021 | Sharma | G06F 8/10 |
| 10,986,540 | B2 * | 4/2021 | Bor Yaliniz | H04W 28/26 |
| 11,115,272 | B1 * | 9/2021 | Kumar | H04L 41/22 |
| 11,379,311 | B2 * | 7/2022 | Aphale | G06F 11/1458 |
| 11,494,275 | B1 * | 11/2022 | Gaudin | G06F 11/3636 |
| 2002/0069367 | A1 * | 6/2002 | Tindal | H04L 41/0806 726/5 |
| 2002/0169975 | A1 * | 11/2002 | Good | H04L 41/0856 726/1 |

(Continued)

*Primary Examiner* — Thu Ha T Nguyen
(74) *Attorney, Agent, or Firm* — Fountainhead Law Group P.C.

(57) ABSTRACT

Systems, methods, and computer-readable media are disclosed for receiving a template made up of various components. Multiple stage rules are provided including action bundles as well as network device specifications. The action bundles include primary actions and stage rule execution orders for generating change controls. Generating change controls involves several steps. The network devices are enumerated based on respective network device specifications. Next, the action bundles are associated with each of the respective network devices. Finally, the change control is provided to a network management backend, and the network management backend applies the change control to the network devices.

20 Claims, 7 Drawing Sheets

(56) References Cited

U.S. PATENT DOCUMENTS

| | | | |
|---|---|---|---|
| 2007/0130192 A1* | 6/2007 | Bolder | H04L 41/0843 707/999.102 |
| 2009/0172687 A1* | 7/2009 | Bobak | G06Q 10/06 718/104 |
| 2010/0071035 A1* | 3/2010 | Budko | H04L 63/10 726/4 |
| 2014/0207927 A1* | 7/2014 | Fichtenholtz | H04L 67/56 709/223 |
| 2015/0193418 A1* | 7/2015 | Koska | H04L 67/10 715/223 |
| 2015/0358358 A1* | 12/2015 | Karhade | H04L 67/55 726/1 |
| 2016/0112317 A1* | 4/2016 | Hood | H04L 41/0893 370/392 |
| 2016/0234250 A1* | 8/2016 | Ashley | H04L 63/20 |
| 2016/0357422 A1* | 12/2016 | Milden | G06F 3/0488 |
| 2017/0011450 A1* | 1/2017 | Frager | G06Q 20/12 |
| 2017/0034023 A1* | 2/2017 | Nickolov | H04L 43/0817 |
| 2021/0089619 A1* | 3/2021 | Bhuyan | G06F 40/106 |
| 2021/0200943 A1* | 7/2021 | Aviyam | G06F 16/953 |
| 2021/0342785 A1* | 11/2021 | Mann | G06F 11/3409 |
| 2022/0147935 A1* | 5/2022 | Moren | G06Q 10/10 |
| 2022/0272163 A1* | 8/2022 | Schuller | H04L 67/34 |
| 2022/0276842 A1* | 9/2022 | Delpech de Frayssinet | G06F 8/447 |

* cited by examiner

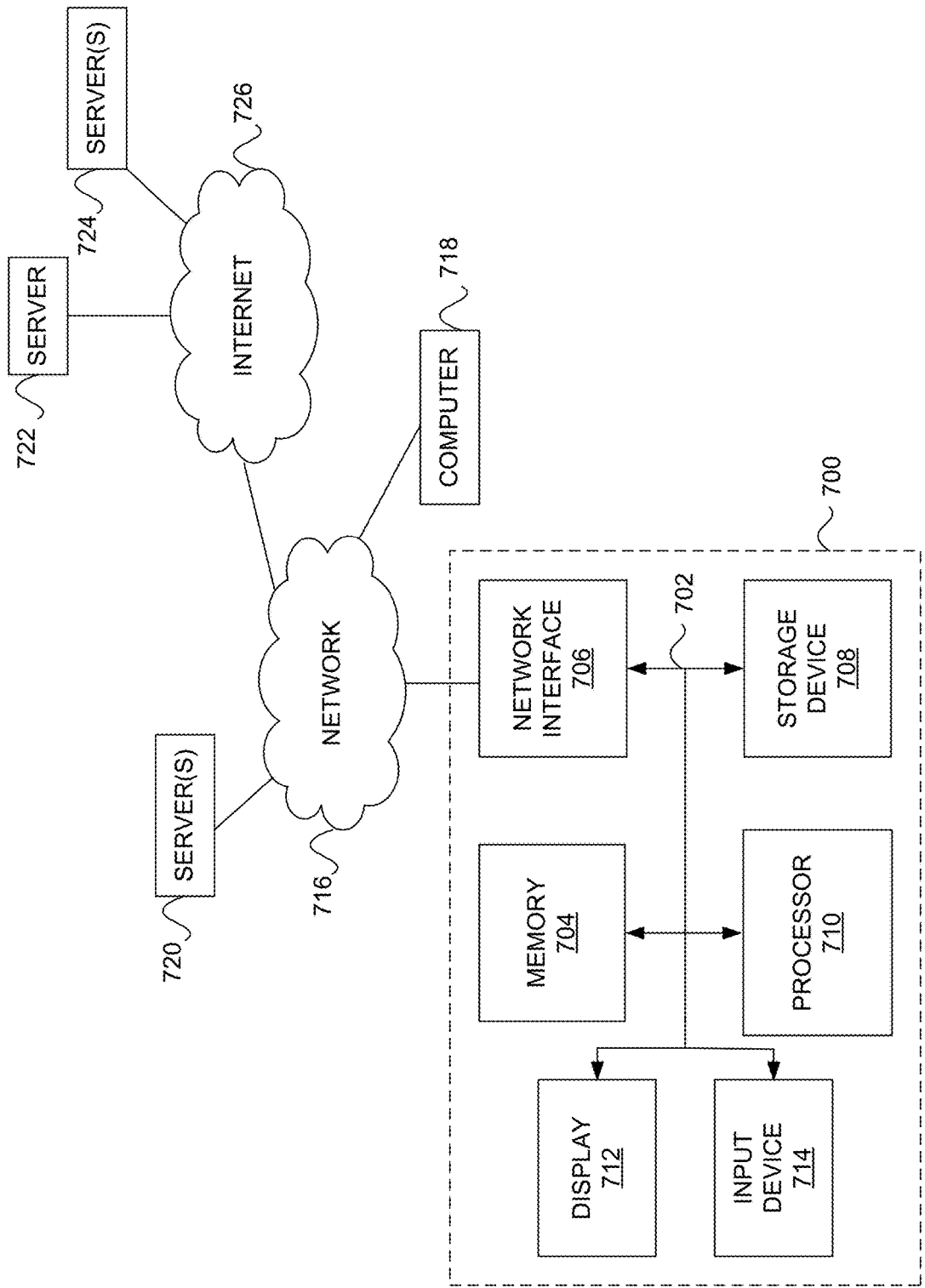

STRUCTURED NETWORK CHANGE CONTROLS

BACKGROUND

A multitude of network devices, such as routers and network switches, can be deployed to implement large and/or complex data networks. Companies or universities, for example, may host hundreds of network devices to provide a network of sufficient bandwidth and speed to support the needs of users (e.g., students, employees). An issue with networks of such size is monitoring, tracking, and updating configurations for the underlying network devices. Distributing upgrades and configuration updates so that the target network devices are appropriately maintained is a time-intensive and tedious endeavor for a team of network administrators. Moreover, ensuring proper configuration of devices in a large network is a painstaking task involving maintaining and tracking specific details for each of the network devices.

Within this framework, network operators are constantly making modifications to their network via configuration changes and image upgrades. These changes may be rolled up in predefined "task" operations, however, in some cases, tasks must run in a specific order, or they must be coupled with other actions to ensure network stability. Such sequences of work vary for each network, so an operator needs a way to define this execution of changes and apply this sequencing for each batch of network changes. In some cases, a network operator must perform advanced configuration changes repeatedly on each specific device in a multitude of network devices.

BRIEF DESCRIPTION OF THE DRAWINGS

With respect to the discussion to follow, and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 7 illustrates an example hardware platform according to one or more embodiments.

DETAILED DESCRIPTION

Overview

Figure 1:
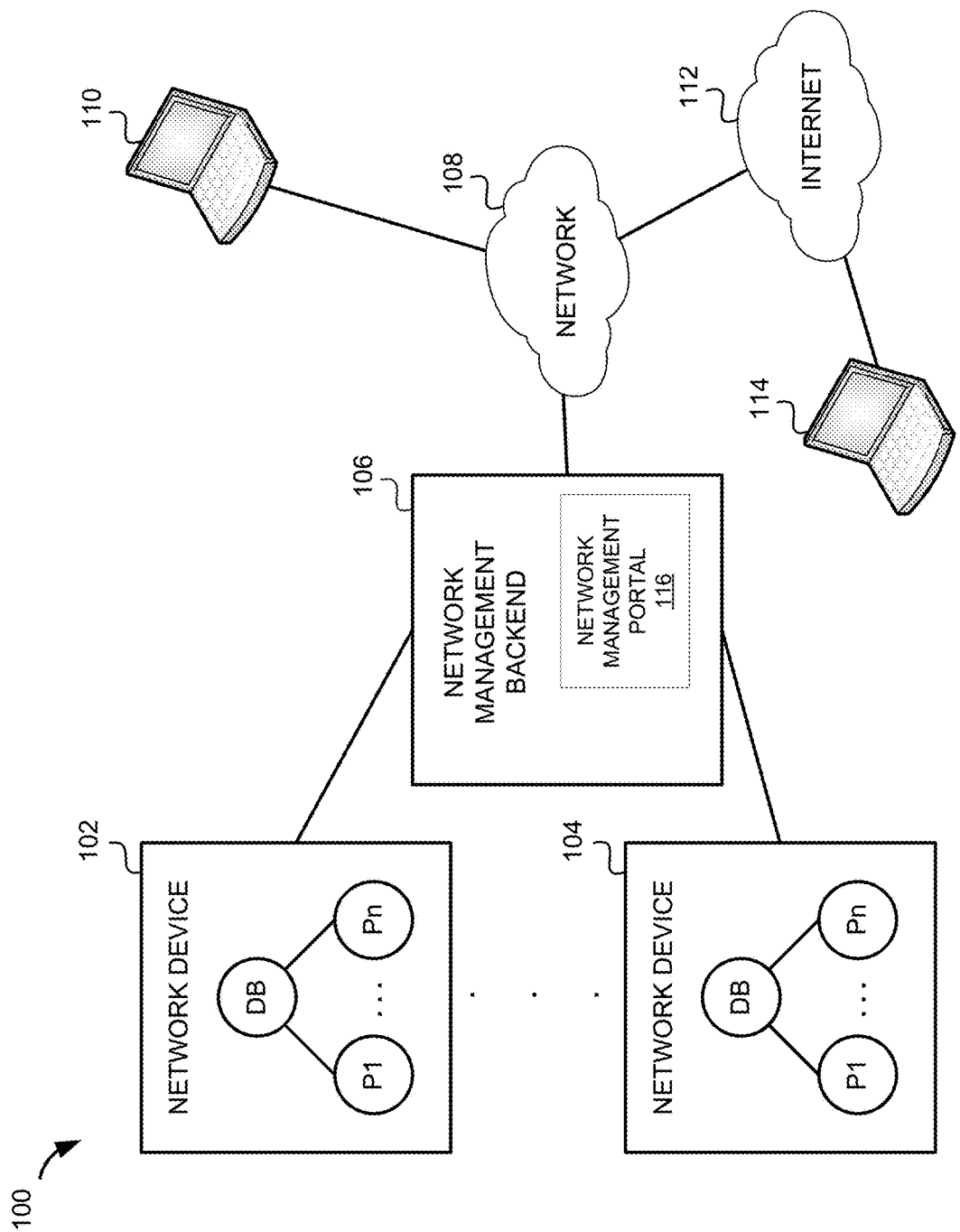
FIG. 1 illustrates an environment in which template-based structured network change controls operate according to one or more embodiments.

A need exists for mechanisms that allow a network operator to perform advanced configuration changes over a range of network devices without having to repeatedly perform the configuration changes on network devices individually. Change control templates enable network administrators to build frameworks for network change control operations. By using change control templates, the network administrators can repeat common change control operations without needing to build the actions and sequences for each stage and each device separately. Existing technology allows a network administrator to set up individual change controls to organize and sequence network changes. The present disclosure builds upon the current ability to sequence, nest, and mix tasks as well as other custom actions in any order. While the existing change control framework provides granular control over network changes, the framework requires that each change control operation be manually sequenced and configured. Many of these changes follow a consistent recurring pattern, and use of mechanisms consistent with the present disclosure removes the time-consuming work of configuring each change control separately.

Change control templates allow network administrators to build and structure common change control operations and to repeat them without having to rebuild or re-specify corresponding actions and sequences. Templates are modifiable, which enables execution of evolving change control operations quickly and efficiently. Action bundle and stage rule tools may be used to configure a change control template. Each stage rule depends on an action bundle for its content. Accordingly, at least one action bundle is needed to employ change control templates. A template is defined by a list of stage rules. Stage rules can be executed in series or parallel at the root of a change control. Stage rules are linked to action bundles, which supply content for a particular stage. An action bundle is a specific sequence of actions that contain up to one task action and any number of non-task actions, including ancillary actions. Containers are logical entities used to group network devices and to define a hierarchy to which configurations can be applied to the network devices in a container. A task is an action to be carried out on a network device that changes fundamental characteristics of the network device such as upgrading an operating system, updating configuration, or adding a device to a container. A non-task action is an action on a networking device that is not defined as a task. Action bundles are reusable across templates and make it possible to construct specific sequences of actions without hard coding the tasks and/or devices to which the tasks and/or devices will be applied.

An action bundle is a collection of reusable steps called actions, which may include a primary action and optional ancillary actions. A primary action may be an operation to be performed on a network device, such as changing a configuration or updating software. Ancillary actions may be operations to prepare a network device for the action and/or confirm the action was completed successfully. A sequence in which the primary action and optional ancillary actions are performed may be specified. Alternatively, the primary action and optional ancillary actions in the action bundle may be performed concurrently.

Stage rules in a template may be arranged in a particular execution sequence or performed concurrently. The execution order within an action bundle, stage rule, and template provides structure for the change control. When a change control is created using a template, the network devices under each stage rule are enumerated and each network device instance is associated with a respective action bundle. The change control may be provided to a back end (e.g., network management backend) for implementation in the network.

Prior to performing a change on a network device such as upgrading an operating system, for example, it may be useful to perform certain pre-flight checks on the networking device to confirm that the networking device is in an appropriate state for the change to be performed. Change control template features consistent with the present disclosure provide various configuration interfaces. Atomic units of work may be grouped together in action bundles, such as a set of actions like: (i) check upstream connectivity to a gateway; (ii) gather device status for pre-flight checks; (iii) execute a software upgrade; (iv) gather device status for pre-flight checks to capture final status; and (v) send notifications. Once action bundles are defined, a change control template is used to specify which devices should be associated with each bundle, and how corresponding bundles should be arranged.

Accordingly, template-based mechanisms consistent with the present disclosure manifest themselves as interfaces for creating template definitions with an associated ability to apply corresponding template definitions to a set of configuration changes. Change control templates allow network administrators to create repeatable patterns for rolling out changes to an overall network based on logical properties of the network. Such template-based mechanisms do not require knowledge of exact device name or device identity in advance of change deployment. This allows network administrators to quickly define pre- and post-change operations, include custom validations, arbitrarily order operations, and more so that network administrators can confidently update networks using pre-designed models. In some embodiments, network administrators may define these models based on tags defining generic roles of network devices (e.g. whether a particular device is a "leaf" or "spine" switch) or defining particular relationships to other devices (e.g. grouping devices that are in the same multi-chassis link aggregation group (MLAG) domain). In this way network administrators can apply templates to a diverse set of configuration changes, and templates can be used across different networks, because templates are not tied to a specific set of devices. In some embodiments, change control template tools are designed to be accessed from a user interface. In some other embodiments, programmatic access via application programming interfaces (API) is also provided. Template mechanisms consistent with the present disclosure enable network administrators to preview a simulated execution order of actions by applying a change control template to a set of network changes. Once an associated change tree is constructed, it may be viewed, and corresponding changes are approved and ultimately executed. Known tools have "dry-run" mechanisms that do not provide capabilities for a network administrator to preview the order in which actions will run and do not provide the ability to make modifications before executing a particular network change.

FIG. 1 illustrates an environment 100 in which template-based structured network change controls operate according to one or more embodiments. In some embodiments, a telemetry platform is provided, which architecture is described below in connection with environment 100. Platform components of environment 100 facilitate streaming of network device-state data from network devices such as network device 102 and network device 104 to network management backend 106. Network management portal 116 may provide an event-driven, streaming analytics platform that enables a network administrator to monitor the state of network devices managed in connection with network management backend 106. Configuring network devices to stream device-state data to network management backend 106 makes it possible to manage any number of network devices to gain valuable insights into the state of a large network, including real-time updates regarding changes in device state and configuration.

In some embodiments, network administrators may access and control network management backend 106 utilizing network management portal 116, which may comprise a web server employing server-side software controls as well as providing client-side software to be executed in a client application executing on a client device such as client device 110 or client device 114. As depicted in FIG. 1, client device 110 may access network management portal 116 by way of network 108, which itself may be a local network associated with a network operator with which a particular network administrator is associated. In some embodiments, a network administrator may access network management portal 116 via a public Internet such as internet 112. Such remote access may be desirable so that a particular network administrator may work on network devices from an arbitrary location.

Figure 2:
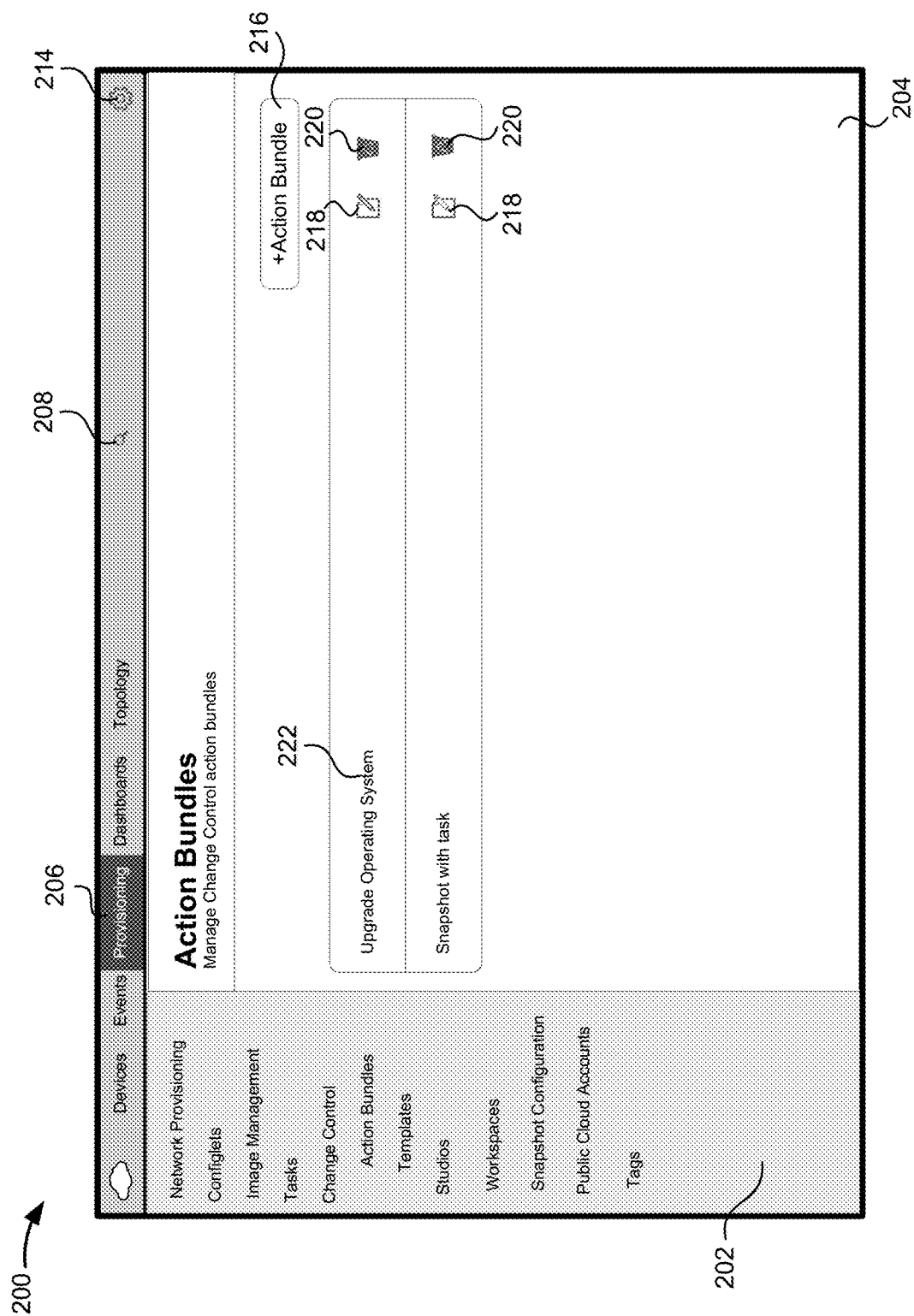
FIG. 2 illustrates an example user interface control for maintaining action bundles according to one or more embodiments.

FIG. 2 illustrates an example user interface control 200 for maintaining action bundles according to one or more embodiments. Action bundles may comprise a predetermined sequence of actions that can include up to one task action and any number of non-task actions. The sequences of actions are applied to stage rules of a template. This is facilitated by an ability to create, edit, and delete action bundles. User interface control 200 illustrates an exemplary user interface for managing action bundles. Within this user interface, managing action bundles may be accomplished by navigating to a "Provisioning" tab in navigation bar 206 and then selecting "Action Bundles" from left side panel 202. From this interface control, it is possible to create a new action bundle by interacting with, i.e., clicking or tapping button 216. Editing an existing action bundle may be accomplished by clicking on a link with a name associated with an existing action bundle such as link 222 within main pane 204 of user interface control 200. Clicking a link such as link 222 may also display read-only information about the particular action bundle, whereas editing the action bundle may be accomplished by clicking or tapping edit button 218. Deletion of an action bundle may be accomplished by clicking or tapping delete button 220, depicted in FIG. 2 as a recycle bin icon.

User interface control 200 depicts additional associated functionality including search button 208 which may provide a search interface into information regarding network devices, and change control template components. Such search functionality may provide the ability to use unstructured search terms to find information regarding network devices and information regarding change control template components. Settings button 214 allows a user to maintain settings associated with a particular network management portal.

Figure 3:
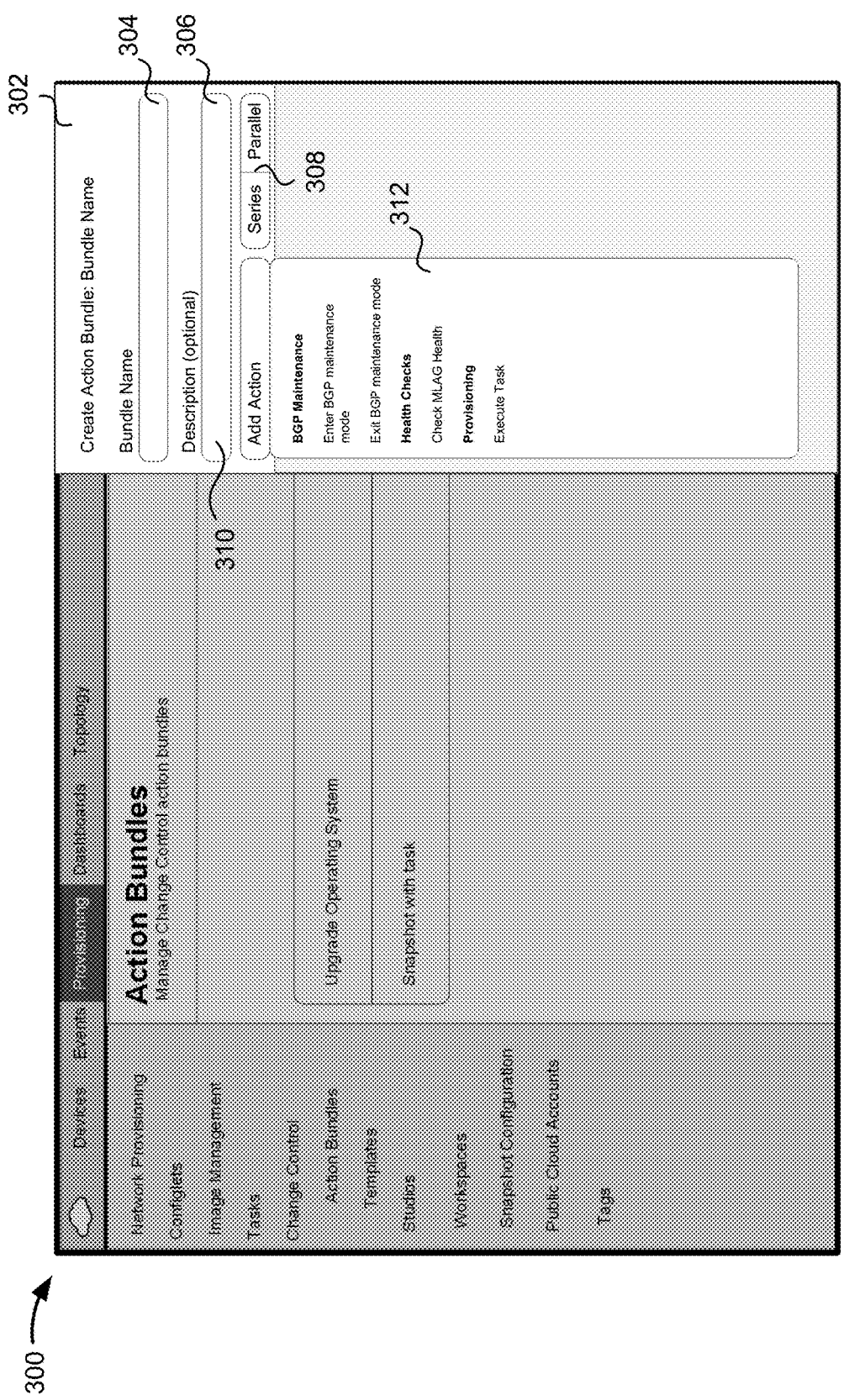
FIG. 3 illustrates an example side panel user interface control for creating action bundles according to one or more embodiments.

FIG. 3 illustrates an example side panel user interface control 300 for creating action bundles according to one or more embodiments. When creating a new action bundle, a network administrator can add up to one task action and any number of non-task actions. Upon selecting "+Action Bundle," as described above in connection with button 216, a side panel may be rendered, which facilitates entering details associated with an action bundle to be created. A user may then input a bundle name in connection with input control 304 and an optional description at input control 306. Next, the user may expand add action dropdown menu 312. This expansion then renders a list of available actions that the user may choose from. Each of the displayed actions, except for "Execute Task" is a non-task action. In some embodiments, it is possible only to add one task action for each action bundle. Depending on the action type selected, there may be additional options regarding which network devices may receive an action assignment. In some embodiments, a network administrator makes a change to an operating system image for a network device or changes some portion of a network device's configuration. Such a modification would generate a task for the associated devices. In alternative embodiments, this process is automated, such that based on incoming telemetry data from devices in the network, configuration changes are automatically suggested. Task actions receive device assignments in connection with a corresponding stage rule of the particular template to which the action bundle is eventually applied.

In connection with compound button 308, a user may select whether actions associated with this action bundle should be executed in series or parallel. A user may then review the list of actions and save the newly created action bundle. Once saved, the action bundle becomes available for assignment to stage rules associated with one or more change control templates. Action bundles may also be created at the time of configuration of stage rules of a change control template.

Similarly to creating an action bundle, editing an action bundle may be accomplished in connection with a side panel similar to side panel 302. As described in connection with FIG. 2 above, a user selects an edit button 218 associated with the particular action bundle the user wishes to modify. This presents the user with a side panel showing existing change control operations and corresponding settings. Users may add new actions, modify the order of existing actions by using up and down arrows, or delete existing actions. Any change control template of which a particular action bundle is a component is updated with the new modifications. An action bundle may not be deleted if it is currently assigned to a change control template.

When creating or editing actions associated with an action bundle, a user can assign device placeholders instead of specific devices to the action. Such device placeholders are then defined when the action bundle is added to the stage rule of a change control template. This provides flexibility to assign the same action bundle to multiple change control templates. Various types of device placeholders may be input and statically applied to a list of devices known to the network management. The set of placeholders available and displayed will vary based upon the combination of action types that have been selected. Consequently, additional placeholders may become available for an action once additional actions have been added to the action bundle. For example, placeholders such as 'Match task device' and 'MLAG peer of selected task' only appear when an action bundle contains a task.

Figure 4:
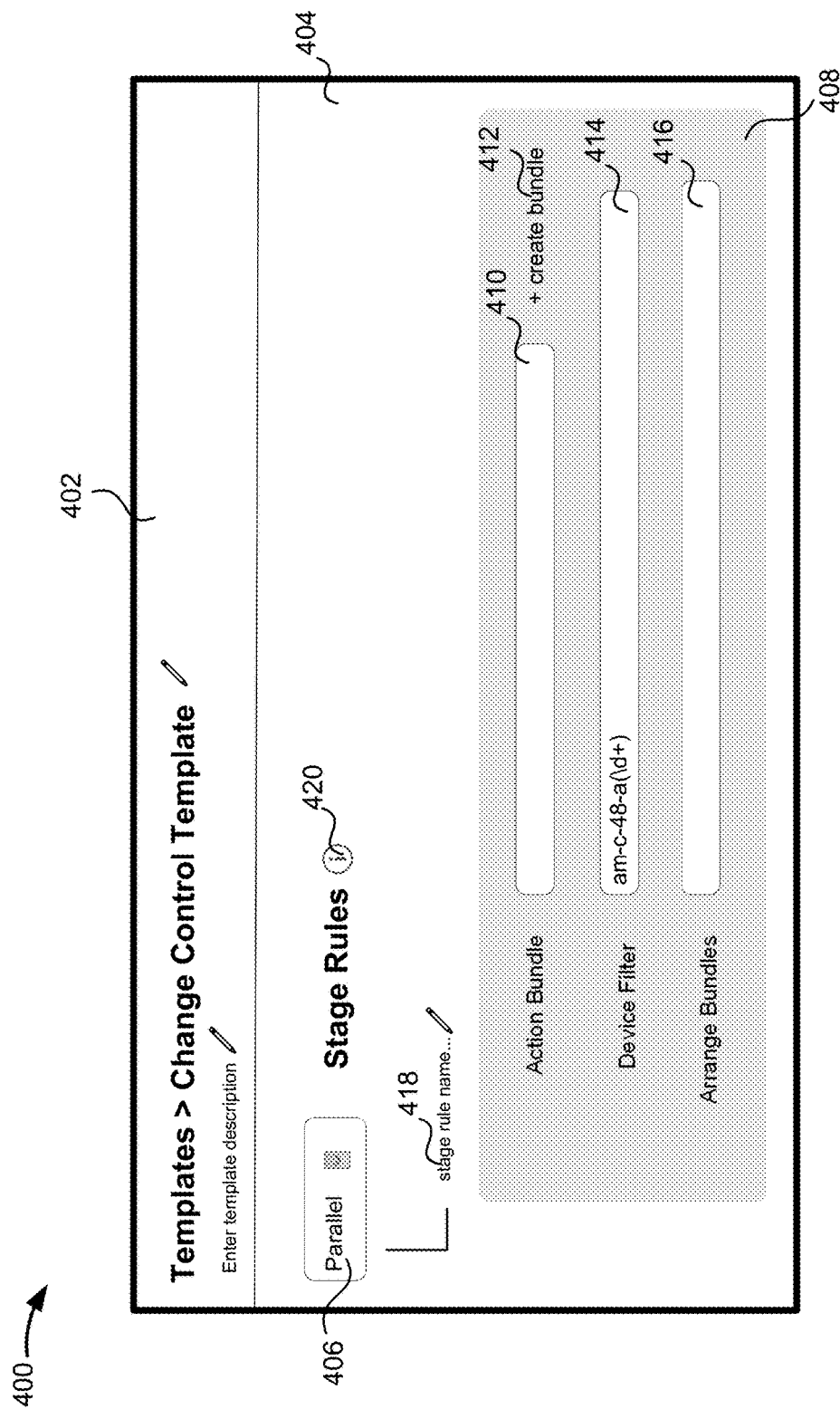
FIG. 4 illustrates an example user interface control for maintaining a change control template according to one or more embodiments.

FIG. 4 illustrates an example user interface control 400 for maintaining a change control template according to one or more embodiments. In connection with top pane 402, a user may maintain a name and associated description of a particular change control template. To edit these fields, the user may click or tap on an edit control icon, illustrated in various places on FIG. 4 as a pencil icon. As described above, action bundles may be assigned to one or more change control templates. This may be accomplished in connection with user interface control 400 by either creating a new bundle or by selecting an existing bundle, which causes rendering of a user interface control such as that described in connection with FIG. 3 above. Creating a new action bundle may be accomplished by activating link 412 denoted "+create bundle," or by searching for an existing action bundle name in connection with action bundle input control 410.

Within a particular change control template, specific actions are bundled and sequenced. Thereafter, the action bundles are grouped into stages to define an upgrade sequence. Applying a template to a change control may be performed in a single operation. Within main pane 404 a user may add/or update stage rules and provide details for stage rules in stage rule details control 408. Button 406 allows the user to specify whether the stage rules should be executed in series or parallel, and stage rule name is displayed in connection with link 418. Text associated with this link may be modified by selecting the adjacent pencil icon. Clicking information icon 420 provides information regarding stage rules associated with the change control template. Alternatively, information icon 420 may be used to provide help information regarding defining stage rules. When a user assigns the action of "Provide via Template" as a placeholder, the user may then configure the placeholder when building an associated change control template. The user can employ a network device filter field, in connection with filter input control 414, in the template's stage rule to which the action bundle is applied. The user may then select "all network devices in change control," which option matches all devices associated with the change control (defined by which tasks are linked to the change control).

Alternatively, the devices may be specified in connection with a matching pattern such as a regular expression or other type of pattern matching mechanism. The pattern matching option allows a user to select certain devices from a change control by defining a pattern to match against a network device identifier such as the hostname of a particular network device. The device associated with an assigned task may be assigned within a change control template using a device filter field. Regular expressions are sequences of characters that specify search patterns in text. Such patterns may be used for pattern matching in strings. Use of regular expressions was originally initiated in connection with theoretical computer science and formal language theory. Filter input control 414 illustrates an example regular expression for matching a set of host names corresponding to a set of network devices. In the example, a text prefix shared by a set of network switches is provided as well as a regular expression that will match one or more numeric digits. In this case, the regular expression would match "am-c-48-a1" and "am-c-48-a100b" as well as any string having one or more digits after the prefix of "am-c-48-a." The exemplary regular expression would, however, not match "am-c-48aa." Nor would it match "am-c-24-a1."

When configuring an action bundle, a user can assign non-task actions with the placeholder "Match Task Device." This placeholder allows for identification of network devices associated with a task to be applied to a particular non-task action. The placeholder "MLAG Peer of Selected Task" enables a user to sequence MLAG upgrades. It may not be possible to run non-task actions on an MLAG peer of the device to which the action bundle's task is assigned. By using this placeholder, a user can run an MLAG health check against the MLAG peer before running the task. This enables the actions to be arranged so that the MLAG health of both the task device and the task device's MLAG peer may be queried before running the task. The last action in the action bundle may then check the MLAG health of the task device after the task has been performed. A static argument may be applied in an action bundle by assigning certain non-task actions to a specific device. This enables a user to run a particular action in connection with a specific device when the action bundle is applied to a change control template's stage rule. A static argument may contain values that are invariable over multiple instances of an action, resulting in reduced configuration in the template. A static argument may also contain sensitive data. such as a password, with a corresponding option to hide (or visually obscure) the value.

Once a template is applied, the result is a nested tree. Button 406 may be used to specify series or parallel execution of the main stage containers. In connection with input 416, a user may specify that devices which match a device filter in filter input control 414 are to be assigned separate bundle containers. These bundle containers may be arranged in series or parallel based on an associated option. Finally, actions in the deepest level of the tree are arranged based on an option in the action bundle definition. In some embodiments a change control template is not permanently linked to a change control. Accordingly, making changes to a template after the template has been applied to a change control will have no effect on the existing change control. A change control template may be applied multiple times. Each time a change control template is applied an associated existing structure may be overwritten, and only the tasks remain as the sole input to the multiply applied template. In some embodiments, a change control API may be applied to construct custom layouts.

Figure 5:
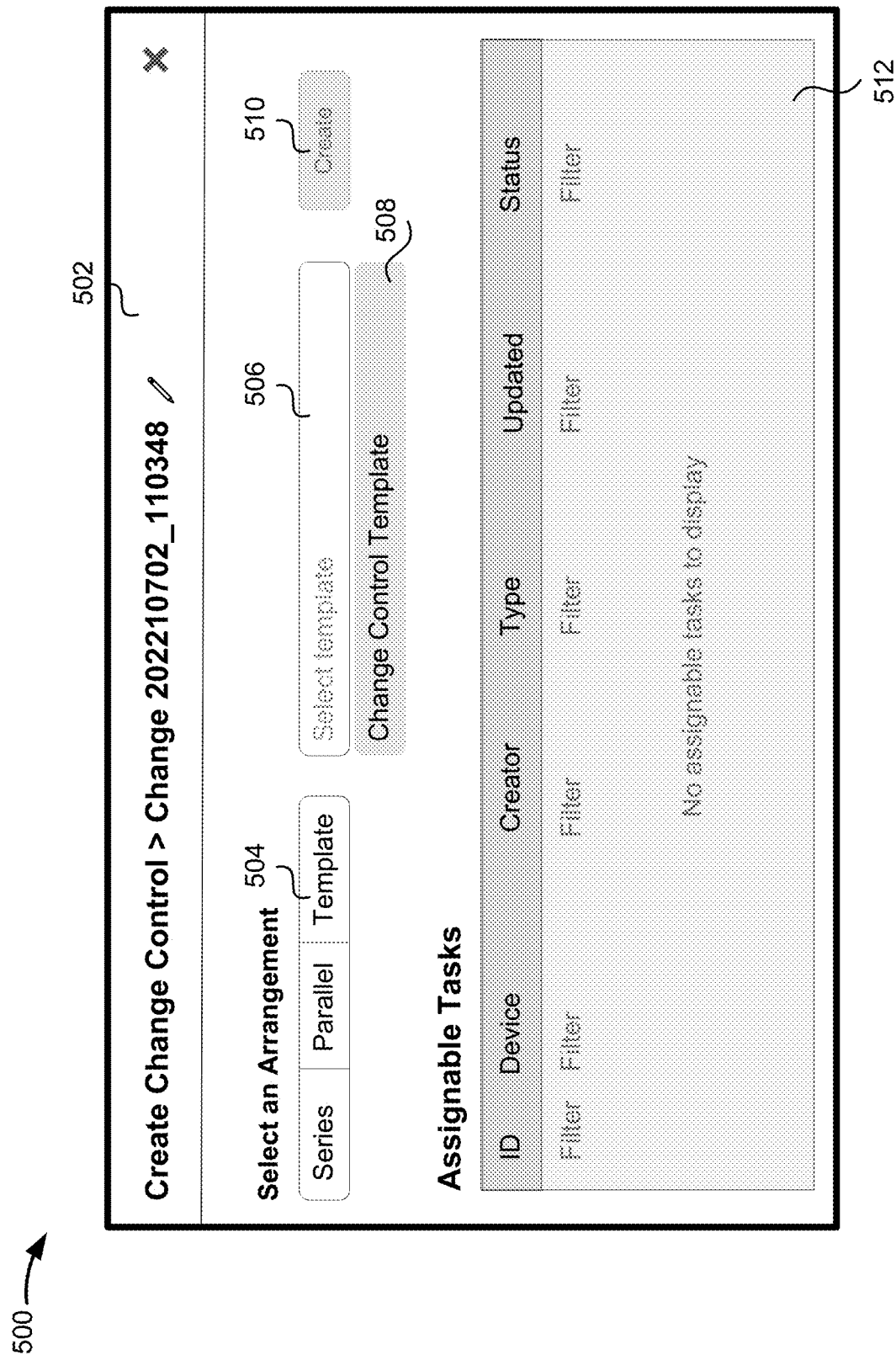
FIG. 5 illustrates an example user interface control for creating change control templates and adding tasks according to one or more embodiments.

FIG. 5 illustrates an example user interface control 500 for creating change control templates and adding tasks according to one or more embodiments. To navigate to user interface control 500, a user may select option "Change Control" under the "Provisioning" tab illustrated in FIG. 2 and click "Create Change Control" from the left side panel 202. Thereafter, a modal user interface control is presented, permitting the user to enter a name for the change control. In connection with assignable tasks control 512, the user may select tasks that should be included in the change control. To build the change control with a change control template, the user may select a template from dropdown 508, which dropdown may be populated by providing partial input into input control 506. Thereafter, the user may select a preexisting template and activate button 510 to create a change control.

The user is then routed to a change control user interface component, from which the user can then revise the change control format, review, and approve proposed network changes, and execute the network changes in connection with the specified network devices. If a change control has been created but not approved or executed, the user may apply a template to the change control. To accomplish this, the user selects a desired change control from an existing change control list. The user is then routed to a change control edit screen associated with the selected change control. The user may then select a template by way of a dropdown menu of existing change control templates. The user may then select the desired template to apply to the change control and click "Apply Template." The template's configuration will then be added to the change control for review and approval.

There are several management operations for use in connection with change control templates. These operations include creating a new template, editing an existing template, and deleting an existing template. When creating a new template, a user can add an arbitrary number of stage rules using one or more action bundles. To create a new change control template, the user may activate a "+Template" input control, whereupon the user is prompted to define one or more stage rules that are associated with an action bundle. The user may then select an action bundle from a drop-down menu or create a new action bundle. Once an action bundle has been assigned, a corresponding stage rule presents additional input fields associated with the specific action bundle. If an action bundle contains device placeholders, a device filter input is rendered. This allows a user to define which devices are to be applied to this action bundle. A sub-stage is created for every populated action bundle. This list of sub-stages may be arranged in series or parallel. This process may be repeated to create a stage rule for each action bundle to be added to a change control template.

Next, the order of the stage rules may be defined by clicking associated move up or down arrows. A particular action bundle may be applied to multiple stage rules, each with a unique device filter. Stage rules may be set to execute in series or parallel. A user may activate an edit user interface control associated with a template that the user wishes to modify. The template user interface control renders its current stage rules and associated details, how the stage rules are ordered, and the manner in which the stage rules will be executed. These details may be updated by changing data within corresponding data fields, using corresponding up and down arrows to change order, or deleting stage rules. In some embodiments, changes made to a template will not be updated for any change control operations to which the template has been applied. In such a case, it would be necessary to reapply the change control template.

Figure 6:
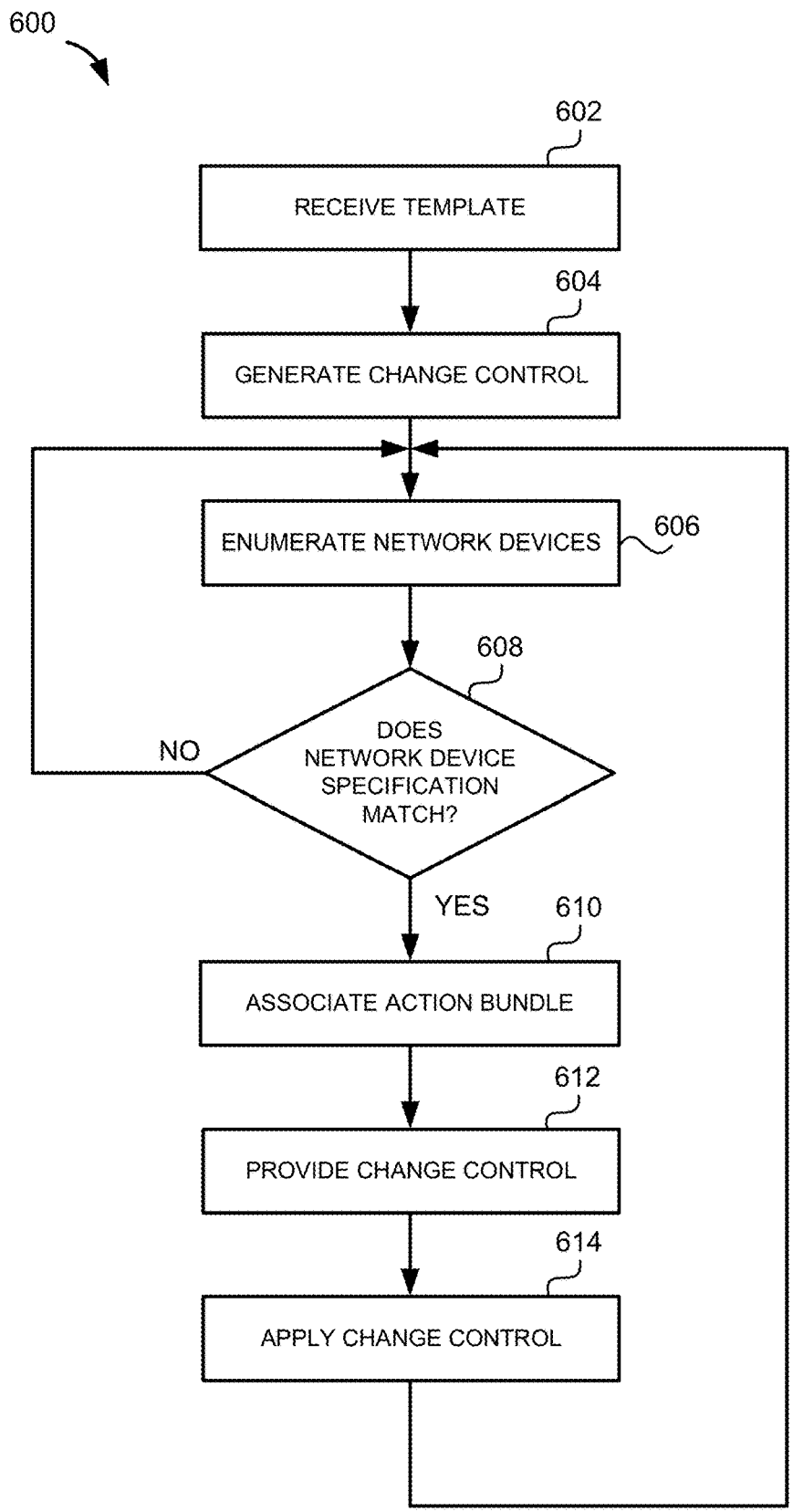
FIG. 6 illustrates an example method for operating template-based structured network change controls according to one or more embodiments.

FIG. 6 illustrates an example method 600 for operating template-based structured network change controls according to one or more embodiments. Method 600 may be performed by one or more appropriate entities described herein, such as a network management portal for managing configuration updates of a group of network devices. The operations described with respect to method 600 may be performed in a different sequence than the sequence of operations shown and described with respect to FIG. 6 without departing from the scope of the present disclosure. Method 600 includes receiving, at stage 602, a change control template including a first stage rule. The first stage rule may include a first action bundle and a first network device specification. The first action bundle may include a first primary action. The change control template may also include a second stage rule. The second stage rule may include a second action bundle and a second network device specification. The second action bundle may include a second primary action. The change control template may also include a stage rule execution order that defines an order of execution of the first and second stage rules. The first and second network device specifications may be derived from network device filter metadata which provides pattern matching, which may be in the form of one or more regular expressions to match against network identifiers such as network device hostnames.

At stage 604 a change control is generated. The process of generating a change control itself comprises several steps. Continuing to stage 606, network devices are enumerated. This enumeration of network devices may be performed based on device filters that either explicitly match a particular device or that are based on pattern recognition. Such pattern recognition may involve the use of one or more regular expressions. At test 608, it is determined whether a particular network device specification matches a device filter. If not, the process continues back to stage 606 and continues enumerating network devices. If, on the other hand, at test 608, it is determined that a particular network device specification matches a device filter, the method continues to stage 610. In some embodiments, the change controls are generated at a client device such as the client devices described in connection with FIG. 1. This may be performed in connection with client software delivered from a network management portal to a client device. Such client software may execute on a client application, which may include a web browser application capable of executing the client software. In some such embodiments, the processes of enumerating network devices, and associating action bundles are carried out in connection with the client software. In some alternative embodiments, the client devices are employed only to provide inputs to a server-side application running on the network management portal. In these embodiments, the steps of generating change controls as well as enumerating network devices and associating action bundles are performed by the server-side application.

At stage 610, one or more action bundles are associated with certain sets of enumerated network devices. These enumerated network devices may comprise the first and second network devices. Next, at stage 612, the change control is provided to one or more network management backends. Finally, at stage 614, a change control is applied against the enumerated network devices to update configurations associated with the enumerated network devices. In some embodiments, each of the first primary action and the second primary action performs at least one of changing a configuration and updating software associated with one or more of the first and second network devices. Each of the first network device specification and the second network device specification may include a regular expression or a tag that may be used in enumerating the network devices and finding network device identifiers that correspond to the device filters. In some cases, tags are assigned to network devices by a user, such as a network administrator, or by the network management backend automatically, based on overall network topology and an associated role of the network device as ascertained in connection with software being executed on the network management backend. Such backend software may implement machine learning techniques for predicting a role associated with a particular network device and tagging associated network devices, accordingly, based for example on trained neural networks.

In some embodiments, the first stage rule further comprises a first stage rule execution order, the first stage rule execution order being a sequence or in parallel and the second stage rule further comprises a second stage rule execution order, the second stage rule execution order being a sequence or in parallel. The first action bundle may further comprise at least one first ancillary action and a first action bundle execution order, the first action bundle execution order being a sequence or in parallel, and the second action bundle may further comprise at least one second ancillary action and a second action bundle execution order, the second action bundle execution order being performed in series or in parallel.

FIG. 7 illustrates an example hardware platform according to one or more embodiments. Computer 700 can be a desktop computer, a laptop computer, a server computer, a mobile device such as a smartphone or tablet, or any other form factor of general- or special-purpose computing device containing at least one processor. Depicted with computer 700 are several components, for illustrative purposes. Certain components may be arranged differently or be absent. Additional components may also be present. Included in computer 700 is system bus 702, via which other components of computer 700 can communicate with each other. In certain embodiments, there may be multiple busses or components may communicate with each other directly. Connected to system bus 702 is processor 710. Also attached to system bus 702 is memory 704. Also attached to system bus 702 is display 712. In some embodiments, a graphics card providing an input to display 712 may not be a physically separate card, but rather may be integrated into a motherboard or processor 710. The graphics card may have a separate graphics-processing unit (GPU), which can be used for graphics processing or for general purpose computing (GPGPU). The graphics card may contain GPU memory. In some embodiments no display is present, while in others it is integrated into computer 700. Similarly, peripherals such as input device 714 is connected to system bus 702. Like display 712, these peripherals may be integrated into computer 700 or absent. Also connected to system bus 702 is storage device 708, which may be any form of computer-readable media, such as non-transitory computer readable media, and may be internally installed in computer 700 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 706 is also attached to system bus 702 and allows computer 700 to communicate over a network such as network 716. Network interface 706 can be any form of network interface known in the art, such as Ethernet, ATM, fiber, Bluetooth, or Wi-Fi (i.e., the Institute of Electrical and Electronics Engineers (IEEE) 802.11 family of standards). Network interface 706 connects computer 700 to network 716, which may also include one or more other computers, such as computer 718, and network storage, such as cloud network storage. Network 716 is in turn connected to public Internet 726, which connects many networks globally. In some embodiments, computer 700 can itself be directly connected to public Internet 726.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Having thus described various embodiments of the invention, what is claimed as new and desired to be protected by Letters Patent includes the following:

The invention claimed is:

1. A method of operating template-based structured network change controls in connection with a computing device, the method comprising:
   receiving a change control template, the change control template including:
      a first stage rule, the first stage rule including a first action bundle and a first network device specification, the first action bundle including a first primary action;
      a second stage rule, the second stage rule including a second action bundle and a second network device specification, the second action bundle including a second primary action,
      wherein the first stage rule is different from the second stage rule; and
      a change control execution order,
      wherein the change control execution order defines the execution as being carried out in series or in parallel;
   generating a change control, the generating comprising:
      enumerating first network devices based on the first network device specification including one or more first regular expressions;
      associating the first action bundle with each of the first network devices;
      enumerating second network devices based on the second network device specification including one or more second regular expressions; and
      associating the second action bundle with each of the second network devices;

providing the change control to a network management backend; and applying, by the network management backend, the change control to the first network devices and the second network devices to update corresponding device configurations based on the change control execution order.

2. The method of claim 1, wherein each of the first primary action and the second primary action performs at least one of changing a configuration and updating software.

3. The method of claim 1, wherein each of the first network device specification and the second network device specification include one or more tags.

4. The method of claim 3, wherein the tag is assigned by a user or by the network management backend.

5. The method of claim 1, wherein:
the first stage rule further comprises a first stage rule execution order, the first stage rule execution order being carried out in series or in parallel, and
the second stage rule further comprises a second stage rule execution order, the second stage rule execution order being carried out in series or in parallel,
wherein the change control execution order associated with the change control template is different from the first stage rule execution order and the second stage rule execution order.

6. The method of claim 1, wherein:
the first action bundle further comprises at least one first ancillary action and a first action bundle execution order, the first action bundle execution order being carried out in series or in parallel, and
the second action bundle further comprises at least one second ancillary action and a second action bundle execution order, the second action bundle execution order being carried out in series or in parallel.

7. The method of claim 1, wherein generating the change control is performed in a web browser of the computing device.

8. One or more non-transitory computer-readable media storing computer-executable instructions that, when executed by a processor, perform a method of operating template-based structured network change controls, the method comprising:
receiving a template, the template including:
a first stage rule, the first stage rule including a first action bundle and a first network device specification, the first action bundle including a first primary action;
a second stage rule, the second stage rule including a second action bundle and a second network device specification, the second action bundle including a second primary action,
wherein the first stage rule is different from the second stage rule; and
a change control execution order;
generating a change control, the generating comprising:
enumerating first network devices based on the first network device specification;
associating the first action bundle with each of the first network devices;
enumerating second network devices based on the second network device specification; and
associating the second action bundle with each of the second network devices; and providing the change control to a network management backend, the network management backend applying the change control to the first network devices and the second network devices.

9. The one or more non-transitory computer-readable media of claim 8, wherein each of the first primary action and the second primary action performs at least one of changing a configuration and updating software.

10. The one or more non-transitory computer-readable media of claim 9, wherein each of the first network device specification and the second network device specification include a regular expression or a tag.

11. The one or more non-transitory computer-readable media of claim 10, wherein the tag is assigned by a user or automatically by the network management backend.

12. The one or more non-transitory computer-readable media of claim 11, wherein:
the first stage rule further comprises a first stage rule execution order, the first stage rule execution order being executed in series or in parallel, and
the second stage rule further comprises a second stage rule execution order, the second stage rule execution order being executed in series or in parallel,
wherein the change control execution order associated with the change control template is different from the first stage rule execution order and the second stage rule execution order.

13. The one or more non-transitory computer-readable media of claim 8, wherein:
the first action bundle further comprises at least one first ancillary action and a first action bundle execution order, the first action bundle execution order being a sequence or in parallel, and
the second action bundle further comprises at least one second ancillary action and a second action bundle execution order, the second action bundle execution order being executed in series or in parallel.

14. The one or more non-transitory computer-readable media of claim 8, wherein generating the change control is performed in a web browser of the computing device.

15. A system for operating template-based structured network change controls, the system comprising:
a processor; and
one or more non-transitory computer-readable media storing computer-executable instructions that, when executed by the processor, perform a method comprising:
receiving a template, the template including:
one or more action bundles including one or more network device filters, the one or more action bundles including a primary action; and
an action bundle execution order;
generating a change control, the generating comprising:
identifying a plurality of network devices based on the one or more network device filters;
associating the one or more action bundles with each of the plurality of network devices;
providing the change control to a network management backend, the network management backend applying the change control to the plurality of network devices.

16. The system of claim 15, wherein each of the one or more network device filters include a regular expression or a tag.

17. The system of claim 16, wherein the tag is assigned by a user or by the network management backend.

18. The system of claim 15, wherein the template further comprises one or more stage rules.

19. The system of claim 18, wherein:
the one or more stage rules further comprise a stage rule execution order, the stage rule execution order being executed in series or in parallel.
20. The system of claim 15, wherein:
the one or more action bundles further comprise at least one ancillary action and an ancillary action bundle execution order, the ancillary action bundle execution order being executed in series or in parallel.

\* \* \* \* \*